E. H. FROMM.
CONCENTRATING PAN.
APPLICATION FILED NOV. 9, 1918.
1,381,411. Patented June 14, 1921.
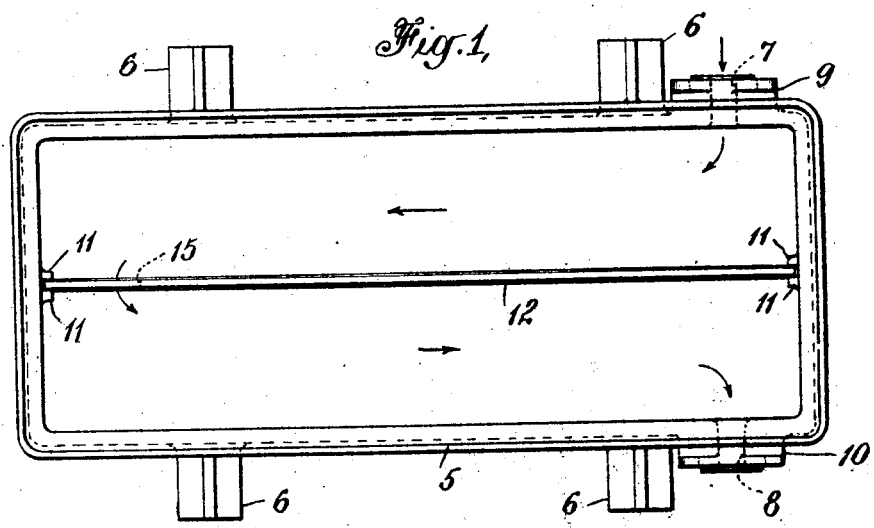
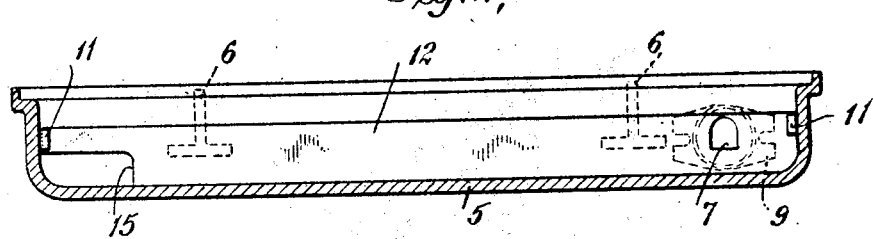
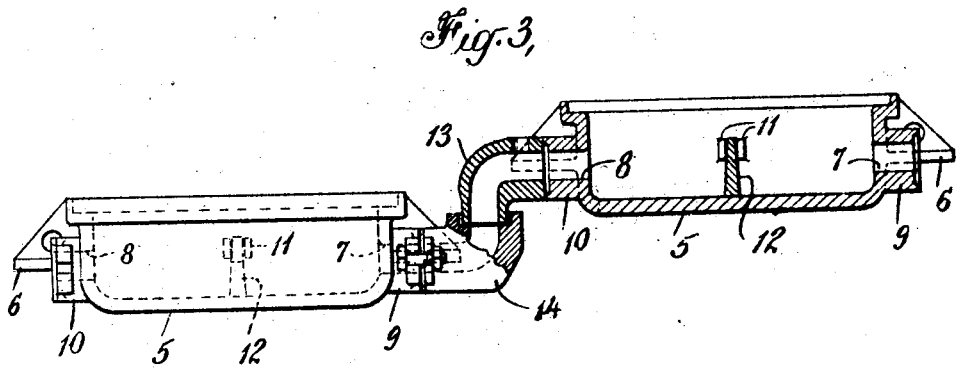

UNITED STATES PATENT OFFICE.

EDWARD H. FROMM, OF ALLENTOWN, PENNSYLVANIA, ASSIGNOR TO FULLER-LEHIGH COMPANY, A CORPORATION OF PENNSYLVANIA.

CONCENTRATING-PAN.

1,381,411.  Specification of Letters Patent.  Patented June 14, 1921.

Application filed November 9, 1918. Serial No. 261,785.

*To all whom it may concern:*

Be it known that I, EDWARD H. FROMM, a citizen of the United States, residing at Allentown, in the county of Lehigh, State of Pennsylvania, have invented certain new and useful Improvements in Concentrating-Pans; and I do hereby declare the following to be a full, clear, and exact description of the invention, such as will enable others skilled in the art to which it appertains to make and use the same.

This invention relates to concentrating pans, and more particularly to pans or vessels for concentrating sulfuric acid. The object of the invention is the provision of an improved concentrating pan, and, more specifically, the provision of an improved concentrating pan of cast metal, particularly adapted for the concentration of sulfuric acid, which is more durable than the types of cast metal concentrating pans heretofore in general use. In this latter connection, a particular aim of the invention is the provision of certain improvements in concentrating pans of cast iron whereby their useful life is materially increased or prolonged.

The acid condensed in the lead chambers, in the lead chamber process of sulfuric acid manufacture, varies in specific gravity from about 1.5 to about 1.62. Such chamber acid is too dilute for most commercial purposes, and it is, accordingly, customary to concentrate the acid, by heating and the evaporation of water, to a specific gravity of about 1.84 (66°Bé). Furthermore, sulfuric acid and its fumes have a great affinity for water, and in many industries in which sulfuric acid is used, the acid becomes weakened in use through the absorption of water. The concentrating or recovery of such dilute or weakened sulfuric acid, for the production of commercial sulfuric acid of 1.84 sp. gr., is extensively carried out in relatively shallow cast iron vessels or pans. These concentrating pans are heated in any suitable manner, and usually, for economical reasons, by waste heat, such, for example, as the waste heat or hot gases from the pyrites or sulfur burners of the sulfuric acid plant.

The concentrating vessels, as usually constructed, are provided with one or more baffles for deflecting the sulfuric acid, as it enters one side of the pan, and causing it to swirl, thus creating a continual turn-over of the acid in its flow to the outlet. The baffles may be longitudinally or transversely positioned within the pan, and both arrangements are standard in the trade today. It has heretofore been the practice to cast the baffles integrally with the pan, by which construction it was supposed that the pan was advantageously strengthened or reinforced.

Considerable difficulty has heretofore been experienced in the cracking of the cast concentrating pans, and a careful study of the causes which eventually necessitate the removal of a pan from the furnace indicates that at least 60% of the pans failed by reason of cracking. Usually, such pans cracked through and across the baffle and at about the center thereof.

After a very careful investigation of this matter, I have discovered that pans cast with an integral baffle, or baffles, are under inherent strains, and that while such a cast pan may appear externally perfect, there are unrelieved conditions of strain present. The pan when set in the furnace is subjected to extremes of temperatures, demanding considerable elasticity of the metal. Through my investigations, I have discovered that the baffle or baffles, when cast integrally with the pan, instead of being a reinforcement, as intended and as heretofore supposed, actually binds or chokes the contraction and expansion, thus causing premature cracking of the pan and necessitating its removal from the furnace.

The present invention contemplates the provision of certain improvements in concentrating pans with the view of decreasing the number of failures due to cracking. In its broad aspect, the invention involves the provision of a non-integral baffle, or baffles, within the concentrating pan. Such a non-integral baffle may be loosely held in position within the pan in any suitable manner, and preferably is removably positioned in the pan and held in place by lugs or projections secured to the inner side walls of the pan.

The novel features of the invention which I believe to be patentable are definitely set forth in the appended claim. These features together with the construction of a concentrating pan embodying the same will now be explained in conjunction with the accompanying drawing, in which:

Figure 1 is a top plan of a concentrating pan embodying the invention; Fig. 2 is a sectional front elevation of the pan; and Fig. 3 is an end elevation, partly in section, of the pan, showing the manner of coupling two pans together in cascade.

The concentrating pan 5 is a relatively shallow receptacle provided with brackets 6 on the outer sides of its longitudinal walls which are designed to rest on suitable shelves, or the like, for properly supporting the pan in the furnace. Oppositely positioned inlet and outlet openings 7 and 8, respectively, are provided near one end of the longitudinal walls. These openings extend through bosses 9 and 10, respectively, which serve, as hereinafter explained, for coupling the pans to the supply and outlet pipes or connections, respectively. Preferably, the brackets 6 and the bosses 9 and 10 are integrally cast with the pan, and the openings 7 and 8 may be cored out in casting, or machined out after the pan is cast.

In accordance with the present invention, pairs of guide lugs or projections 11 are cast on each of the inner walls of the two end members of the pan. A baffle 12 of cast iron is held in position by these lugs, and divides the pan longitudinally into two compartments. The baffle 12 is cut away at one end, opposite the inlet and outlet ends of the pan, so as to provide a communicating passage 15 between the two compartments of the pan. The baffle is thus loosely held in position, and may be removed from the pan at will.

The acid enters the pan through the inlet 7 and striking the baffle 12 is diverted and given a swirling motion. During its passage through the pan in the direction of the arrows, the acid is concentrated by the evaporation of water as a result of the heat to which the pan is subjected. Where several pans are connected in cascade, an outlet coupling 13 is secured to the boss 10 by suitable bolts or clamps and fits into an inlet coupling 14 secured to the boss 9 of the next pan of the series, as illustrated in Fig. 3. The several pans of the series are arranged at progressively lower levels so that the acid flows through the series by gravity.

It will of course be understood that the pan may be provided with more than one baffle, and that the baffle, or baffles, may extend transversely of the pan, instead of longitudinally thereof, as shown in the drawing for explanatory purposes. It will furthermore be understood that the invention is not alone applicable to pans for concentrating sulfuric acid, but may be advantageously embodied in pans for concentrating other acids and other materials, particularly under circumstances where the concentrating vessels are subjected to a more or less uneven heating, or to extremes of temperature.

For concentrating sulfuric acid, I have sucessfully applied the invention to cast iron pans about eight feet long by about three feet wide, and about one foot deep. In such pans, the baffle may advantageously be about seven to eight inches in height, and the passage 15 may be about twelve inches wide and between four and five inches high. The baffle is preferably cast of the same material as the pan, and in the case of the pans just described, was about one and a half inches thick. The foregoing dimensions are recited merely by way of example, and with no intention of limiting the invention to pans of this particular size or configuration.

By the use of the present invention, replacement of pans because of cracking is materially reduced. Careful comparisons show that the life of a pan with a loose baffle is very considerably longer than the life of a similar pan having an integrally cast baffle. In fact, as a result of such comparisons, it may be said that the use of a loose baffle, in accordance with the principles of the present invention, has the effect of increasing the life of cast iron concentrating pans from 300 to 600 per cent.

What I claim is:

A concentrating vessel comprising a relatively shallow pan of cast iron which in practical use is subjected to such changes in temperature as produce considerable expansion and contraction of the material of the pan, a pair of guide lugs integrally cast on each of the inner walls of two opposite sides of the pan, and a baffle positioned in the pan so as to provide a tortuous path for the flow of liquor through the pan, said baffle being loosely and removably held in position within the pan by said pairs of guide lugs thereby permitting expansion and contraction of the pan independently of the baffle; substantially as described.

In testimony whereof I affix my signature.

EDWARD H. FROMM.